US006816454B1

(12) United States Patent
Mallath et al.

(10) Patent No.: US 6,816,454 B1
(45) Date of Patent: Nov. 9, 2004

(54) METHOD AND SYSTEM FOR MANIPULATING THE ORDER PERMANENT CONNECTIONS ARE RELEASED

(75) Inventors: Harisankar C. Mallath, Cranberry, PA (US); Ramprasad Santhanakrishnan, Wexford, PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/179,030

(22) Filed: Oct. 26, 1998

(51) Int. Cl.[7] .......................... G01R 31/08; H04J 12/28
(52) U.S. Cl. ..................... 370/216; 370/395.2; 370/409
(58) Field of Search ................ 370/242, 244, 370/358, 360, 391, 395.1, 397, 399, 392.2, 395.3, 395.4, 395.42, 395.43, 409, 438, 439, 904, 905, 197, 437, 232, 379, 382, 392, 474, 395.21, 395.31, 420, 416, 254, 401, 216, 396, 228, 218; 709/243, 227; 707/104.1; 703/21; 714/49

(56) References Cited

U.S. PATENT DOCUMENTS

| | | | | |
|---|---|---|---|---|
| 5,530,806 A | * | 6/1996 | Condon et al. ............... | 714/49 |
| 5,689,501 A | * | 11/1997 | Takase et al. ............... | 370/244 |
| 5,721,727 A | * | 2/1998 | Ashi et al. .................. | 370/244 |
| 5,805,593 A | * | 9/1998 | Busche ...................... | 370/396 |
| 5,850,538 A | * | 12/1998 | Steinman .................... | 703/21 |
| 5,914,938 A | * | 6/1999 | Brady et al. ................. | 370/254 |
| 5,933,422 A | * | 8/1999 | Kusano et al. .............. | 370/228 |
| 5,959,993 A | * | 9/1999 | Varma et al. ................ | 370/397 |
| 6,041,037 A | * | 3/2000 | Nishio et al. ................ | 370/228 |
| 6,055,239 A | * | 4/2000 | Kato .......................... | 370/397 |
| 6,147,965 A | * | 11/2000 | Burns et al. ................. | 370/216 |
| 6,208,623 B1 | * | 3/2001 | Rochberger et al. ........ | 370/254 |
| 6,304,549 B1 | * | 10/2001 | Srinivasan et al. .......... | 370/230 |
| 6,353,594 B1 | * | 3/2002 | Tooker et al. ............... | 370/218 |
| 6,442,132 B1 | * | 8/2002 | Burns et al. ................. | 370/218 |
| 6,446,079 B2 | * | 9/2002 | Tooker et al. ............. | 707/104.1 |
| 6,490,245 B2 | * | 12/2002 | Burns et al. ................. | 370/216 |
| 6,563,827 B1 | * | 5/2003 | Brueckheimer et al. .... | 370/473 |

FOREIGN PATENT DOCUMENTS

| | | | | |
|---|---|---|---|---|
| EP | WO-9804097 A1 | * | 1/1998 | ........... H04Q/11/04 |
| EP | 0 961 518 A2 | * | 12/1999 | ........... H04L/12/56 |
| WO | WO 98/04097 | * | 1/1998 | ............. J04Q/11/04 |

* cited by examiner

Primary Examiner—Duc Ho
Assistant Examiner—Phuongchau Ba Nguyen
(74) Attorney, Agent, or Firm—Ansel M. Schwartz

(57) ABSTRACT

A telecommunications system. A switch for routing established SPVx connections of a telecommunications network having a telecommunications system. A manipulating mechanism for manipulating the order in which connections of a telecommunications network of a telecommunications system are released when there is a failure in the network and established connections fail. A method for responding to failures in a telecommunications network of a telecommunications system.

23 Claims, 5 Drawing Sheets

METHOD AND SYSTEM FOR MANIPULATING THE ORDER PERMANENT CONNECTIONS ARE RELEASED

FIELD OF THE INVENTION

The present invention is related to the release of soft permanent connections when there is a failure in a telecommunications network and established connections in the network fail. More specifically, the present invention is related to manipulating the order in which the connections are released based on priority and service category when there is a failure in the network and established connections fail.

BACKGROUND OF THE INVENTION

SPVC is a soft permanent virtual path or channel connection. The two ends of this connection are permanent and the connection between them is dynamically established using signaling procedures and the optimal routing path. The advantage of this is that the permanent portion's VPI/VCI will not change while the connection is being re-established. However, when there is a failure in the network and the connections fail, the connections must be released and then re-established. Heretofore, the way connections are released is by iterating the hash buckets, which is not necessarily in the desired order.

When SPVCs are used in a big voice and data network, it is important that the voice traffic is given more priority. The voice have less delay in connection establishment and re-establishment when compared to data. The present invention provides for connections to be prioritized, and released according to this prioritization.

SUMMARY OF THE INVENTION

The present invention pertains to a telecommunications system. The system comprises M terminating nodes which receive switched permanent connections, where M is greater than or equal to 1 and is an integer. The system comprises N originating nodes which request switched permanent connections, where N is greater than or equal to 1 and is an integer. The system comprises a network through which the connections between the originating nodes and the terminating nodes are established. The terminating nodes and originating nodes are connected to the network. The system comprises a mechanism for manipulating the order in which the connections are released when there is a failure in the network and established connections fail.

The present invention pertains to a switch for routing established SPVx connections of a telecommunications network having a telecommunications system. The switch comprises a memory. The switch comprises a list of the connections. The list is disposed in the memory. The switch comprises a mechanism for manipulating the order in which the connections are released when there is a failure in the network and established connections fail. The manipulating mechanism is connected to the memory.

The present invention pertains to a manipulating mechanism for manipulating the order in which connections of a telecommunications network of a telecommunications system are released when there is a failure in the network and established connections fail. The manipulating mechanism comprises a memory. The manipulating mechanism comprises a list of the connections. Each connection has a priority. The list is disposed in the memory. The manipulating mechanism comprises a controller which releases the connections in the order of each connection's priority. The controller is connected to the memory.

The present invention pertains to a method for responding to failures in a telecommunications network of a telecommunications system. The method comprises the steps of detecting a failure in the network. Then there is the step of manipulating the order in which established permanent connections are released.

The present invention pertains to a method for managing soft permanent connections. The method comprises the steps of releasing connections, each of which have priority, based on each connection's priority. Then there is the step of re-establishing the connections based on each connection's priority. Preferably, before the releasing step, there is the step of establishing connections.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
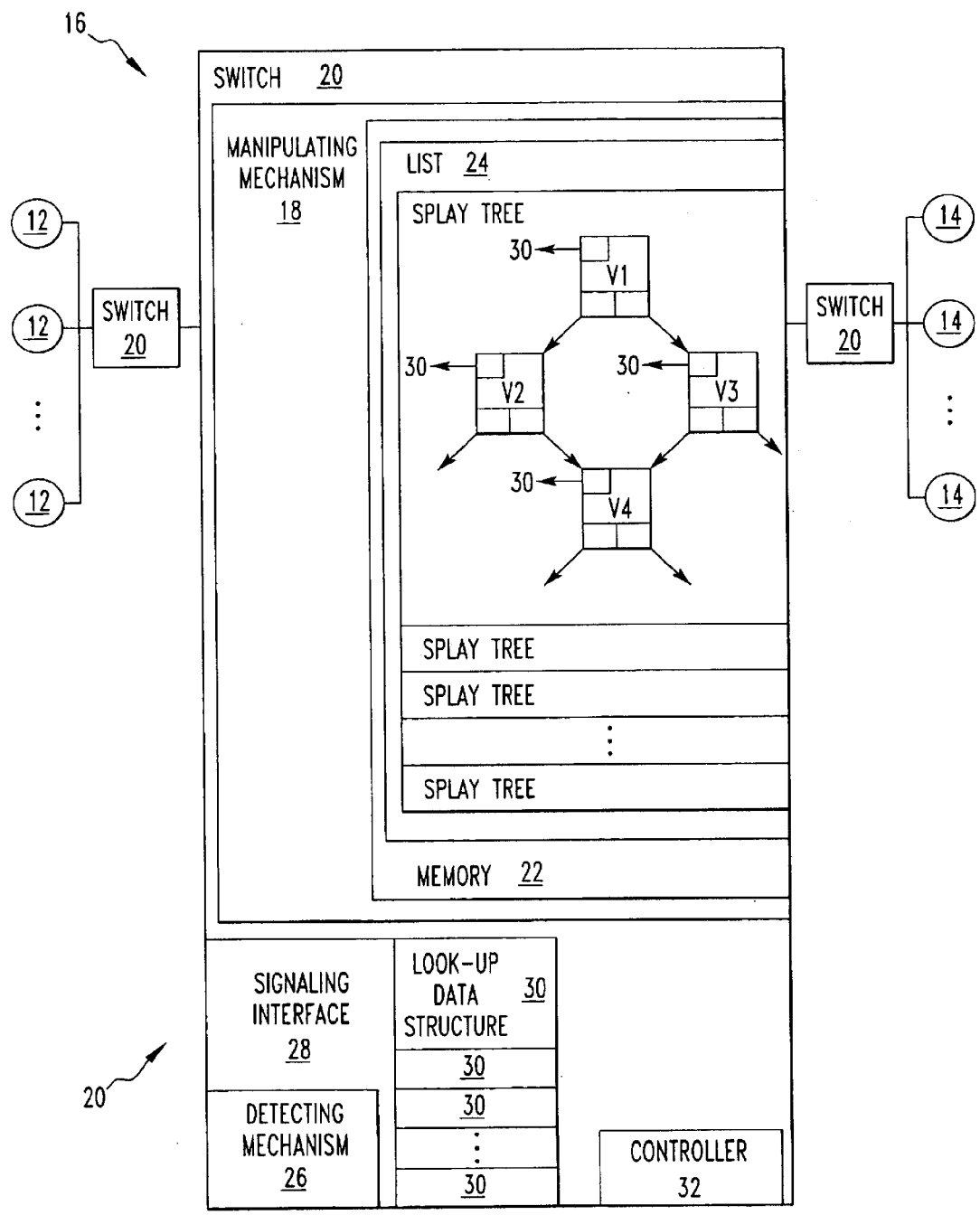
FIG. 1 is a schematic representation of the system of the present invention.
Figure 2:
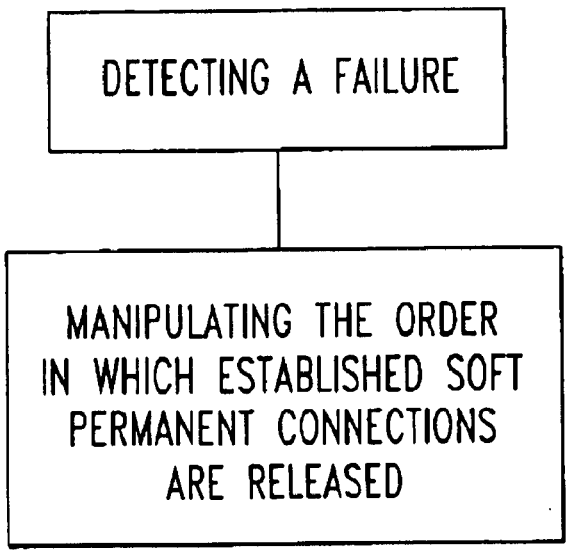
FIG. 2 is a flow chart of a method of the present invention.
Figure 6:
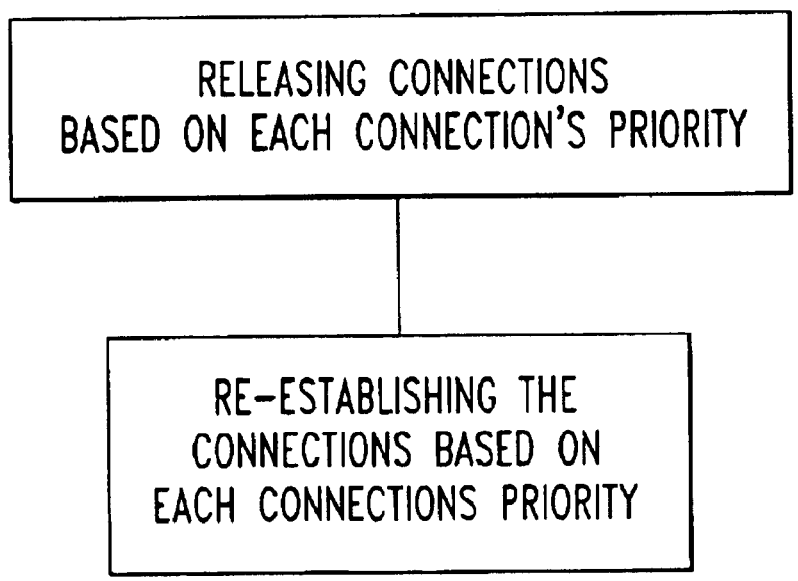
FIG. 6 is a flow chart of an alternative method of the present invention.

Referring now to the drawings wherein like reference numerals refer to similar or identical parts throughout the several views, and more specifically to FIG. 1 thereof, there is shown a telecommunications system. The system comprises M terminating nodes which receive switched permanent connections, where M is greater than or equal to 1 and is an integer. The system comprises N originating nodes which request switched permanent connections, where N is greater than or equal to 1 and is an integer. The system comprises a network through which the connections between the originating nodes and the terminating nodes are established. The terminating nodes and originating nodes are connected to the network. The system comprises a mechanism for manipulating the order in which the connections are released when there is a failure in the network and established connections fail.

Preferably, the network includes a switch which routes the connections. The manipulating mechanism is disposed in the switch. The manipulating mechanism preferably includes a memory; and a list of the connections which are routed through the switch, said list disposed in said memory. Preferably, each connection has a priority and the manipulating mechanism releases the connections in order of each connection's priority.

The network preferably is an ATM network. Preferably, the ATM network comprises S switches, where S is great than or equal to 2 and is an integer. Each switch has a manipulating mechanism.

Each switch preferably has a mechanism for detecting failure in the network and the switch of the S switches whose detecting mechanism first detects a failure in the network releases the connections.

Preferably, each switch has at least one signaling interface for connections through each switch, and the interface has a plurality of look up data structures for storing connections associated with the signaling interface. The look up data structures preferably include hash buckets. Each connection preferably has a service category and the manipulating mechanism releases connections associated with a signaling interface based on the priority and the service category of the connections. Preferably, the list includes a splay tree of connections for each service category for the signaling interface, and the manipulating mechanism includes a controller which maintains the splay tree for each service category.

Preferably, the manipulating mechanism releases connections having service categories of voice or video before connections having service categories of data and according to their respective splay tree. The controller preferably sorts each service category in the release priority order of CBR connections followed by VBR connections followed by ABR connections followed by UBR connections. The connections preferably include SPVx connections and each splay tree includes all of the SPVx connections for each service category sorted in release priority order. Preferably, the controller sorts the splay tree within a service category in the release priority order of sub-category SPVPCs, followed by sub-category SPVCs, followed by sub-category SVPs followed by sub-category SVCs.

The present invention pertains to a switch for routing established SPVx connections of a telecommunications network having a telecommunications system. The switch comprises a memory. The switch comprises a list of the connections. The list is disposed in the memory. The switch comprises a mechanism for manipulating the order in which the connections are released when there is a failure in the network and established connections fail. The manipulating mechanism is connected to the memory.

Preferably, each connection has a priority and the manipulating mechanism releases the connections in order of each connection's priority. The switch preferably include a mechanism for detecting failure in the network. The detecting mechanism is connected to the manipulating mechanism. Preferably, the switch includes a signaling interface for connections through the switch. The interface has a plurality of look up data structures for storing connections associated with the signaling interface. The list has the connections associated with the signaling interface.

The present invention pertains to a manipulating mechanism for manipulating the order in which connections of a telecommunications network of a telecommunications system are released when there is a failure in the network and established connections fail. The manipulating mechanism comprises a memory. The manipulating mechanism comprises a list of the connections. Each connection has a priority. The list is disposed in the memory. The manipulating mechanism comprises a controller which releases the connections in the order of each connection's priority. The controller is connected to the memory.

Preferably, each connection has a service category and the controller releases each connection based on the priority and the service category of each connection. The list preferably includes a splay tree of switched connections for each service category, and the controller maintains the splay tree for each service category.

The present invention pertains to a method for responding to failures in a telecommunications network of a telecommunications system. The method comprises the steps of detecting a failure in the network. Then there is the step of manipulating the order in which established soft permanent connections are released.

Preferably, each connection has a priority and the manipulating step includes the step of releasing the connections in the order of each connection's priority. The network preferably comprises S switches, where S is greater than or equal to 2 and is an integer, and the manipulating step includes the step of releasing the connections at the switch of the S switches which first detects the failure in the network. Preferably, each connection has a service category, and the releasing step includes the step of releasing the connections in the order of each connection's service category. Each switch preferably includes a signaling interface and before the detecting step there is the step of storing connections associated with the signaling interface routed by the switch in look up data structures.

Preferably, the manipulating step includes the step of maintaining a splay tree of switched connections for each service category for the signaling interface. The maintaining step preferably includes the step of sorting each service category in the release priority order of CBR connections followed by VBR connections followed by ABR connections followed by UBR connections. Each splay tree preferably includes all the SPVx connections for each service category, and the sorting step includes the step of sorting the splay tree within each service category in a release priority order of sub-category SPVPCs, followed by sub-category SPVCs, followed by sub-category SVPs followed by sub-category SVCs.

The present invention pertains to a method for managing permanent connections. The method comprises the steps of releasing connections, each of which have priority, based on each connection's priority. Then there is the step of re-establishing the connections based on each connection's priority. Preferably, before the releasing step, there is the step of establishing connections.

In the event of a breakdown of a part of a network at the middle of a big network, all data and voice SPVCs will be cleared and will have to be re-established again through alternate routes. To accelerate the re-establishment of voice SPVCs at the originating end, the SPVC establishment prioritization scheme can be used, as described in U.S. patent application Ser. No. 09/137,791, titled "System and Method for Establishing SPVx Connections" by Ramprasad Santhanakrishnan filed on Aug. 21, 1998, in the U.S. Patent and Trademark Office, incorporated by reference herein. However, this may just not be enough to achieve high re-establishment rates for voice SPVCs. By applying the concept of priority to the releasing of the calls also, the re-establishment rate of the voice calls can be enhanced. This is the main idea of release prioritization among SPVCs based on service category [voice or data].

The switch that first detects the failure in the network is intelligent enough to release the voice connections before the data connections so that the release for all voice connections can reach the originating node before the release for data connections. This way the voice VCs are retried at the source for alternate routes earlier than the data VCs. Having release prioritization at the core, coupled with the setup prioritization at the edges, enormously reduces the down time for voice SPVCs. In addition to releasing the SPVCs based on the service category [voice or data], if the release of the dynamic path connections is done before the dynamic channel connections, better re-establishment times for all voice VCs in the entire network can be achieved. Further fine tuning of this concept is achieved if the release priority of individual connections can be signaled during the signaling call establishment phase with a global network priority scheme.

In an ATM switch, for a signaling interface there is a need for storing all the connections on that interface by using efficient lookup data structures like hash buckets. This helps call establishment procedures and selective call termination procedures. In the event of a failure in the core of a network, all calls for a signaling interface will have to be released in a switch. In such situations, if these data structures [hash buckets] are iterated, the calls will not be released in the required order. This necessitates the need for having a separate data structure that can be iterated to release the calls in the desired order. To achieve the release prioritization of the SPVCs based on service category, a splay tree of switched connections for each service category is maintained. The service categories are sorted in the release priority order of CBR connections followed by VBR connections followed by ABR connections followed by UBR connections. The splay tree will contain all the SPVCs for that service category sorted in the release priority order. The release order within a service category is SPVPCs [Soft Permanent Path Connection] followed by SPVCs [Soft Permanent Channel Connection], followed by SVPs, [Switched Virtual Paths] and finally SVCs [Switched Virtual Channels]. So when all the calls on a particular signaling interface are to be torn down, an ordered splay tree walk on these splay trees suffices to release calls in the desired order. The advantage of having a separate splay tree for each service category is that the releasing order among the service categories can be dynamically changed with ease. This means that if VBR calls have to be released before CBR calls, then the VBR splay is iterated before the CBR splay tree.

Figure 3:
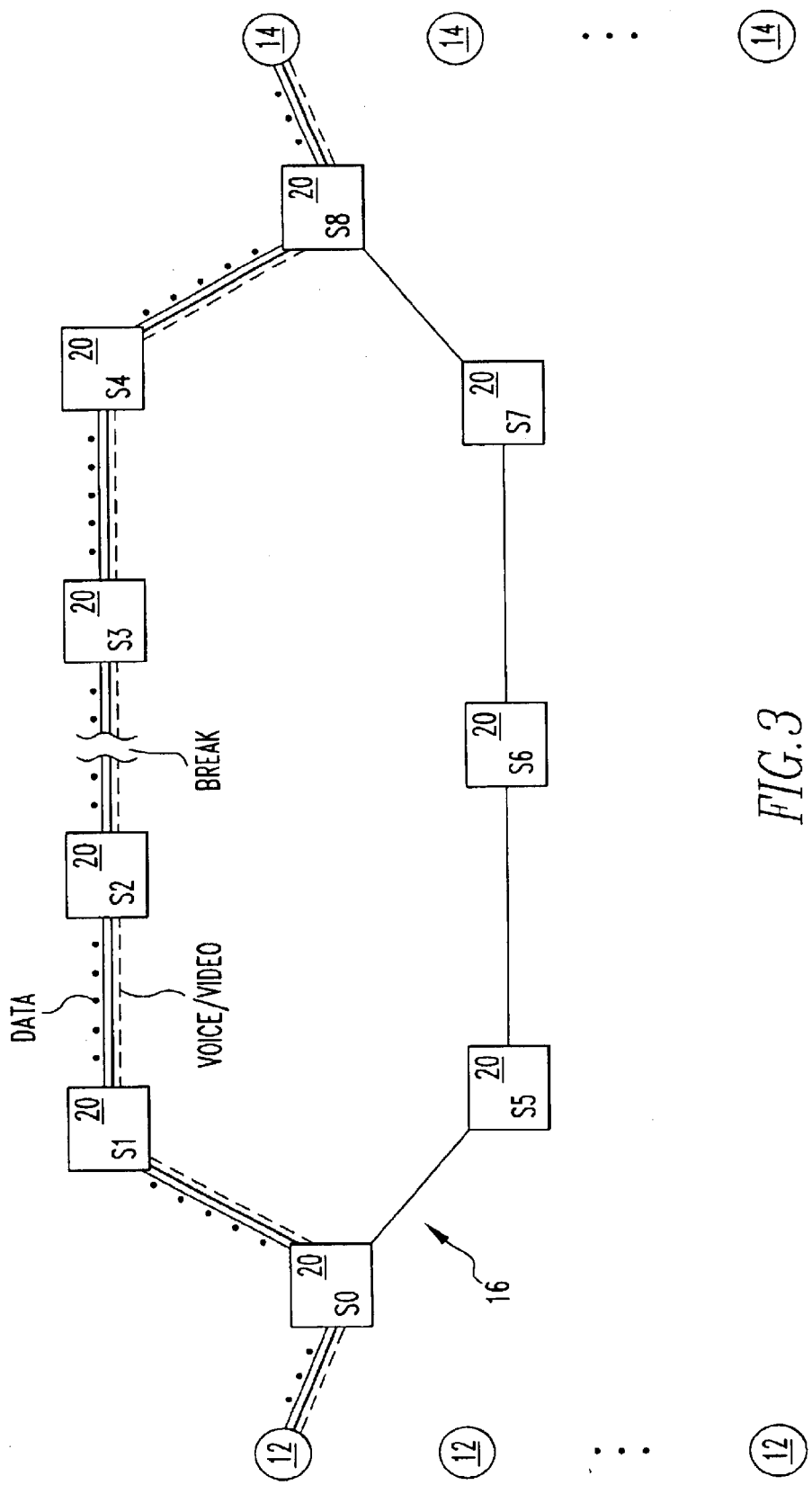
FIG. 3 is a schematic representation of an exemplary system.
Figure 4:
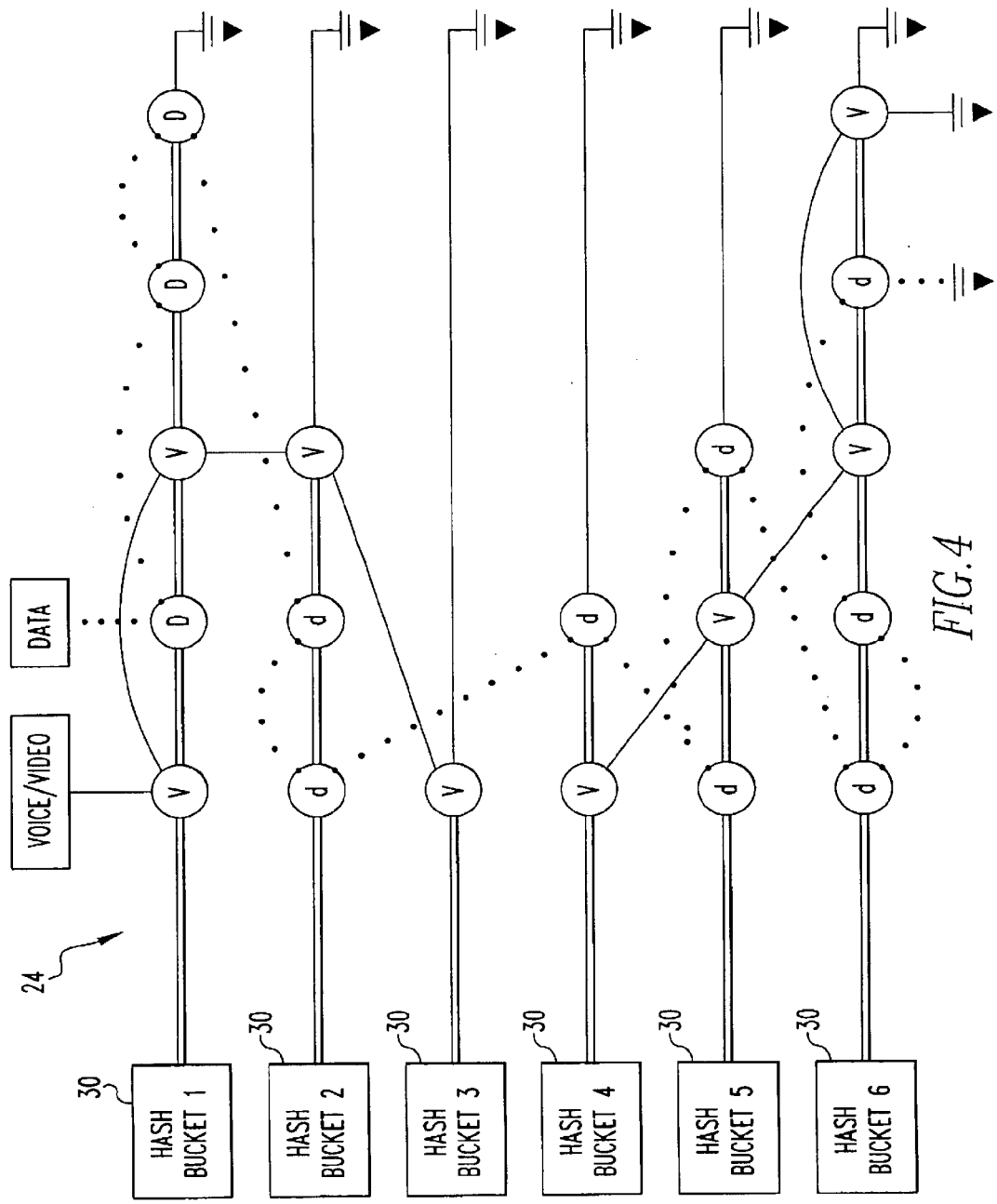
FIG. 4 is a schematic representation of an example of hash buckets with a list of voice/video and data connections described logically.

Referring to FIG. 3, there is shown a telecommunications system having the telephone exchange as an originating node and a telephone exchange as a terminating node with a telecommunications network having switches providing connectivity between the originating node and the terminating node. Traffic, composed of data which is represented by a dotted line travels across the network and voice and/or video (traffic where time is of the essence) which is represented by dashes travels across the network. As traffic of connections travels through each switch, the traffic is organized into hash buckets associated with a signaling interface of the switch, as is well known in the art and as shown in FIG. 4.

Figure 5:
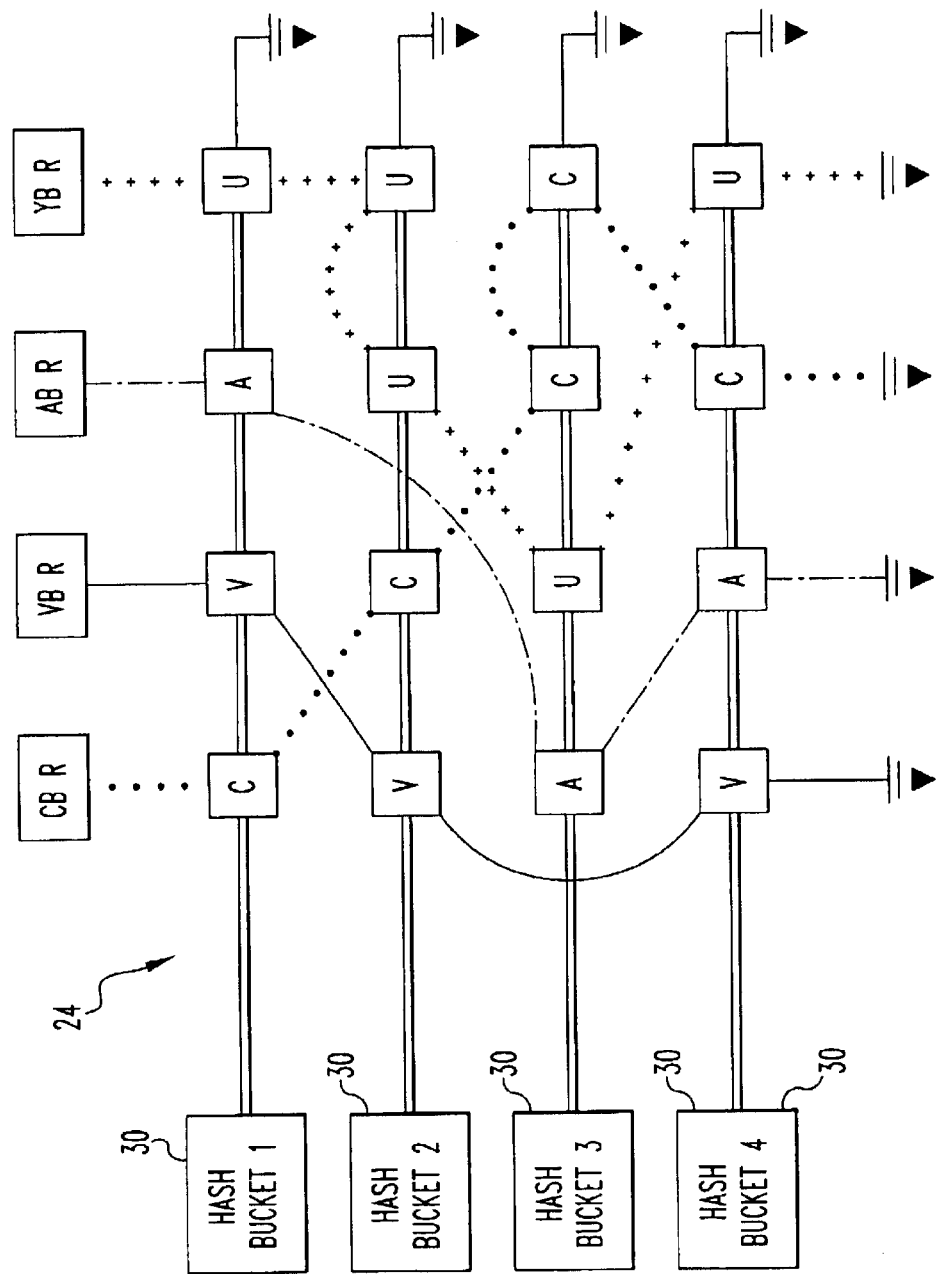
FIG. 5 is a schematic representation of an example of a specific implementation of hash buckets with a list of CBR, VBR, ABR and UBR connections.

When there is a failure in the network, for instance between switch S2 and switch S3, switch S2 detects the failure through the detecting mechanism, as is well known in the art. Once the detecting mechanism detects the failure in the network and that connections have failed, the manipulating mechanism releases the connections. The controller in the manipulating mechanism releases the connections not by how they are organized in the hash buckets, but instead by how they are organized in a separate list associated with each service category of the signaling interface in the form of a splay tree as shown in FIG. 4. For a given type of connection of the signaling interface, as shown in the FIG. 4, all of the voice/video connections are linked together through all the different hash buckets so when the voice/video connections are released, they will be released one after the other throughout all the hash buckets. Similarly, all of the data connections are linked through the hash buckets so the data connections are released in order, regardless of what hash buckets they are in. In turn, each splay tree of a connection is comprised of splay trees based on whether they are CBR, VBR, ABR or UBR connections, as shown in FIG. 5. The splay tree affords the ability to add or remove connections easily, as is well known in the art in regard to this type of structure, during normal operation of the telecommunications system when there is no failure of the network and connections are being added or removed over time. The splay tree is formed of pointer mechanisms, each of which maintains a pointer to a memory location having the associated connection information, and a pointer to the next pointer mechanism associated with the next connection in the splay tree and also a pointer to the "previous" pointer mechanism associated with the previous connection in the splay tree. A splay node has next and previous pointers.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:

M terminating nodes which receive switched permanent connections, where M is an interger;

N originating nodes which request switched permanent connections, where N is an interger;

a network through which the connections between the originating nodes and the terminating nodes are established, wherein each connection at its terminating node and originating node is permanent and the connection between them is dynamically established using signaling procedures and an optimal routing path, said terminating nodes and originating nodes are connected to the network; and a mechanism for manipulating the order in which the connections are released when there is a failure in the network and established connections fail, the manipulating mechanism having a list of the switched permanent connections, each connection has a priority and a service category and the manipulating mechanism releases connections based on the priority and the service category of the connections, the manipulating mechanism releases the connections having service categories of voice or video before connections having service categories of data.

2. The telecommunication system as described in claim 1 wherein the manipulating mechanism includes a memory; and a list of the connections which are routed through the switch, said list disposed in said memory.

3. The telecommunication system as described in claim 2 wherein the network is an ATM network.

4. The telecommunication system as described in claim 3 wherein the ATM network comprises S switches, where S is an integer, each switch having a manipulating mechanism.

5. The telecommunication system as described in claim 4 wherein each switch has a mechanism for detecting failure in the network and the switch of the S switches whose detecting mechanism first detects a failure in the network releases the connections.

6. The telecommunication system as described in claim 5 wherein each switch has at least one signaling interface for connections through each switch, and the interface has a plurality of look up data structures for storing connections associated with the signaling interface.

7. The telecommunication system as described in claim 6 wherein the manipulating mechanism releases connections associated with a signaling interface based on the priority and the service category of the connections.

8. The telecommunication system as described in claim 7 wherein the list includes a splay tree of connections for each service category for the signaling interface, and the manipulating mechanism includes a controller which maintains the splay tree for each service category.

9. The telecommunication system as described in claim 8 wherein the look up data structures include hash buckets.

10. The telecommunication system as described in claim 9 wherein the manipulating mechanism releases connections having service categories of voice or video before connections having service categories of data and according to their respective splay tree.

11. The telecommunication system as described in claim 10 wherein the connections includes soft permanent path or soft permanent channel or switched virtual paths or switched virtual connections and each splay tree includes all of the soft permanent path or soft permanent channel or switched virtual paths or switched virtual connections for each service category sorted in release priority order.

12. The telecommunication system as described in claim 11 wherein the controller sorts the splay tree within a service category in the release priority order of sub-category soft permanent path connections, followed by sub-category soft permanent channel connections, followed by sub-category switched virtual paths followed by sub-category switched virtual channels.

13. The telecommunication system as described in claim 12 wherein the controller sorts each sub-category in the release priority order of CBR connections followed by VBR connections followed by ABR connections followed by UBR connections.

14. A switch for routing soft permanent path or soft permanent channel or switched virtual paths or switched virtual connections of a telecommunications network having a telecommunications system comprising:
   a mechanism for dynamically establishing the soft permanent path or soft permanent channel or switched virtual paths or switched virtual connections using signal procedures and an optimal routing path;
   a memory;
   a list of the soft permanent path or soft permanent channel or switched virtual paths or switched virtual connections, said list disposed in said memory;
   a mechanism for manipulating the order in which the connections are released when there is a failure in the network and established connections fail, said manipulating mechanism connected to the memory, the manipulating mechanism releases the connections having service categories of voice or video before connections having service categories of data; and
   a mechanism for detecting failure in the network, said detecting mechanism connected to the manipulating mechanism.

15. The switch as described in claim 14 wherein each connection has a service category and wherein the manipulating mechanism releases connections based on the priority and service category of the connections.

16. The switch as described in claim 15 wherein the manipulating mechanism releases the connections having service categories of voice or video before connections having service categories of data.

17. The switch as described in claim 16 including a signaling interface for connections through the switch, said interface has a plurality of look up data structures for storing connections associated with the signaling interface, said list having the connections associated with the signaling interface.

18. A method for responding to failures in a telecommunications network of a telecommunications system comprising the steps of:
   establishing switched permanent connections between originating nodes and terminating nodes of the network, where each connection at its terminating node and originating node is permanent and the connection between them is dynamically established using signaling procedures and an optimal routing path, each connection has a service category, the network comprises S switches, where S is an integer, each switch includes a signaling interface;
   storing connections associated with the signaling interface routed by the switch in look up data structures;
   detecting a failure in the network; and
   manipulating the order in which the established switched permanent connections are released from a list of the connections according to the order of each connection's priority and service category, including the steps of releasing the connections at the switch of the S switches which first detects the failure in the network land maintaining a splay tree of switched connections for each service category for the signaling interface wherein the steps of releasing the connections having service categories of voice or video before connections having service categories of data.

19. The method as described in claim 18 wherein the sorting step includes the step of sorting each category in the release priority order of CBR connections followed by VBR connections followed by ABR connections followed by UBR connections.

20. The method as described in claim 19 wherein each splay tree includes all the soft permanent path or soft permanent channel or switched virtual paths or switched virtual connections for each service category, and the maintaining step includes the step of sorting the splay tree within each service category in a release priority order of sub-category soft permanent path connections, followed by sub-category soft permanent channel connections, followed by sub-category switched virtual paths followed by sub-category switched virtual channels.

21. The method as described in claim 20 including after the splay tree sorting step, there is the step of changing dynamically the release order among the service categories.

22. The method as described in claim 21 including before the releasing step, there is the step of establishing connections.

23. A telecommunications system comprising:
   M terminating nodes which receive switched permanent connections, where M is an integer;
   N originating nodes which request switched permanent connections, where N is an integer;
   an ATM network through which the connections between the originating nodes and the terminating nodes are established, said terminating nodes and originating nodes are connected to the network; and
   a mechanism for manipulating the order in which the connections are released when there is a failure in the network and established connections fail, the manipulating mechanism having a list of the switched permanent connections, the ATM network comprises S switches which route the connections, where S is an integer, each switch having a manipulating mechanism, each switch has a mechanism for detecting failure in the network and the switch of the S switches whose detecting mechanism first detects a failure in the network releases the connections, each switch has at least one signaling interface for connections through each switch, and the interface has a plurality of look up data structures for storing connections associated with the signaling interface, each connection has a service category and wherein the manipulating mechanism releases connections associated with a signaling interface based on the priority and the service category of the connections, the list includes a splay tree of connections for each service category for the signaling interface, and the manipulating mechanism includes a controller which maintains the splay tree for each service category, the manipulating mechanism includes a memory; and the list of the connections which are routed through the switch disposed in said memory, each connection has a priority and the manipulating mechanism releases the connections in order of each connection's priority.

* * * * *